Dec. 29, 1942.   W. B. JOHNSON ET AL   2,306,388
TOW BAR
Filed July 15, 1941   2 Sheets-Sheet 1
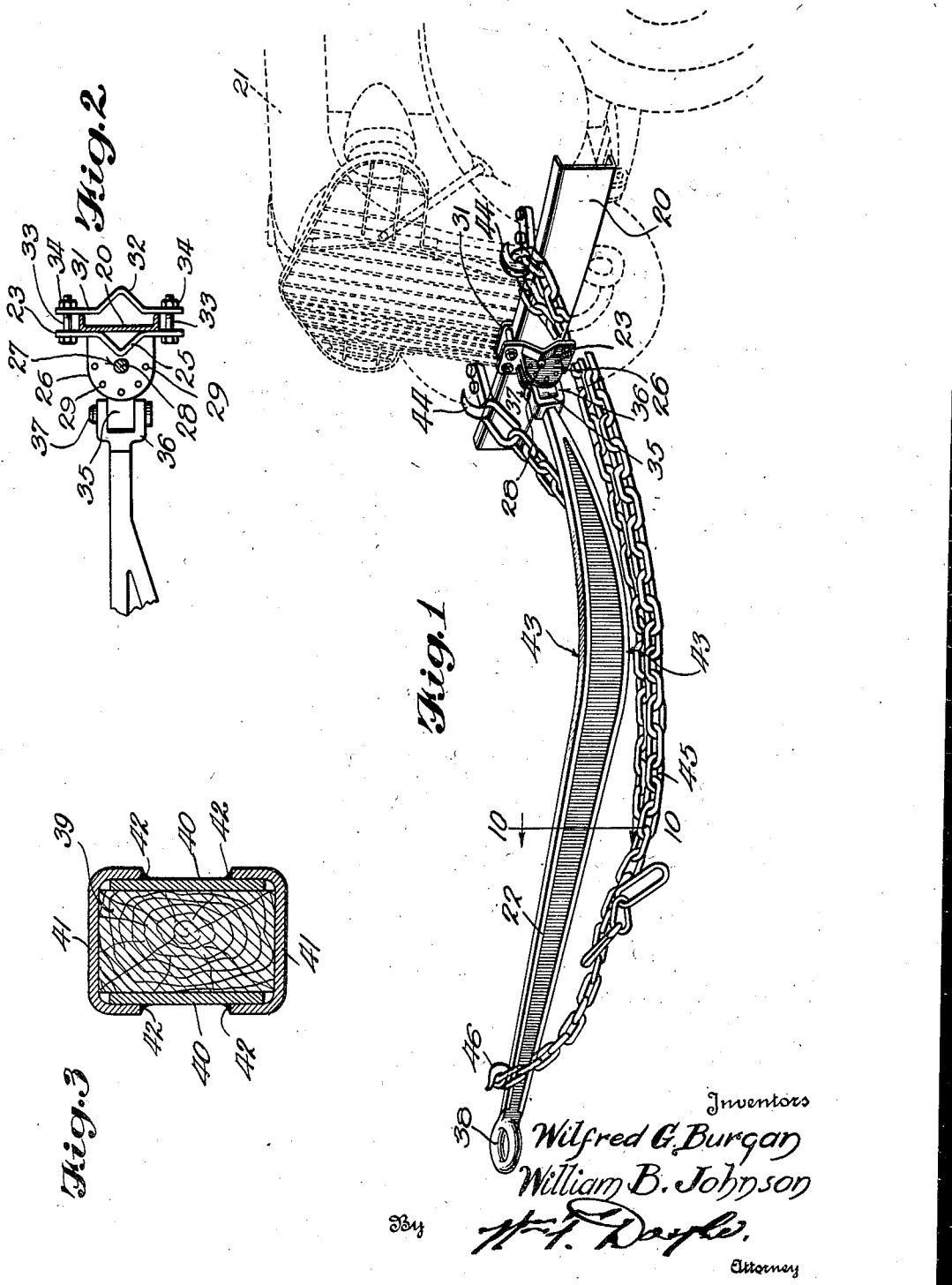
Inventors
Wilfred G. Burgan
William B. Johnson
By Wm. T. Doyle
Attorney

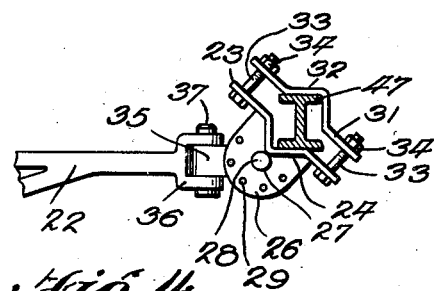
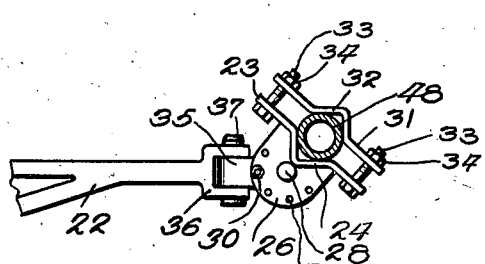
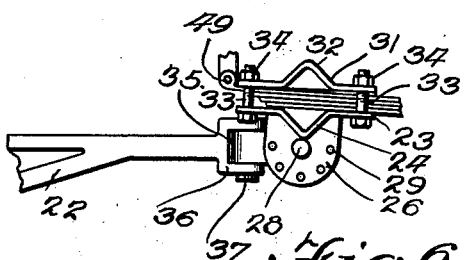
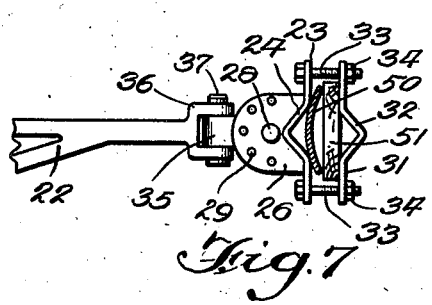
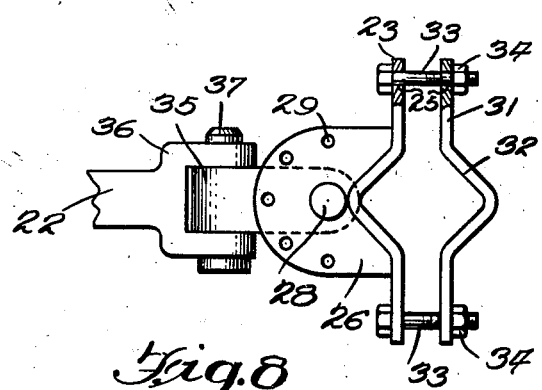
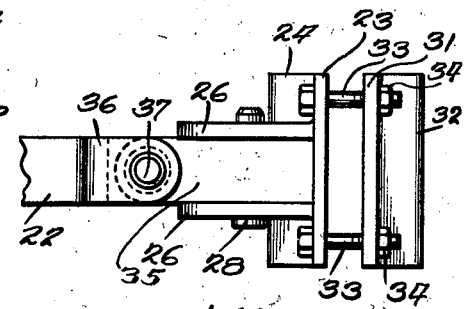

Patented Dec. 29, 1942

2,306,388

UNITED STATES PATENT OFFICE 2,306,388

TOW BAR

William B. Johnson, United States Army, and Wilfred G. Burgan, Washington, D. C.

Application July 15, 1941, Serial No. 402,542

2 Claims. (Cl. 280—33.14)

(Granted under the act of March 3, 1883, as amended April 30, 1928; 370 O. G. 757)

The invention described herein, if patented, may be manufactured and used by or for the Government for Governmental purposes without the payment of any royalty thereon.

This invention relates to a tow bar assembly designed for the purpose of providing a simple but strong equipment so constructed that it can be manufactured easily and economically and be universal in its application to all makes and types of motor vehicles by varying the method of attachment to the vehicle being towed.

The present invention has been developed after many standard tow bar assemblies have failed to meet the requirements of universal service on various types of axles and bumpers of motor vehicles.

Various tests have been made and it has been determined through actual application that this tow bar can be used on automobiles, trucks, etc., regardless of the height of the bumper or axle, or shape and size of each.

Due to the height of the axle from the ground on the new 4-wheel drive trucks and the variation between these heights and the height of the bed of the trucks, the tow bars in use at the present time cannot be used successfully.

Hence, the important object of this invention is to provide a tow bar which requires only slight modifications to adapt it to be used with bumpers of various sizes and heights, as well as with axles of various sizes and heights.

Another important object of this invention is to provide a tow bar which, in an emergency, may be utilized as a lever for lifting the front end of light vehicles or one end of the axle of heavy vehicles, so that the lifted portion of the vehicle can be shored up by lugs or other convenient supports for a quick repair of a wheel or tire, thus avoiding the necessity of carrying a jack for each vehicle in a convoy.

A further object of the invention is the provision of a towing bar which can be quickly and readily placed in position and securely held in position between a towed and a towing vehicle and prevent any displacement of the same while the towed vehicle is being towed to a place for repairs.

Another object of the invention is to provide a tow bar, including relatively few parts, and these so co-related as to reduce the liability of derangement to a minimum.

With the above and other objects and advantages in view, the invention consists of features of construction, arrangement and operation of parts which will appear in the specification and be finally pointed out in the claims.

While the preferred embodiment of the invention is shown, it will be understood that slight changes in form and minor details of construction may be resorted to without departing from the spirit of the invention and fall beyond the scope of the claims.

Referring now to the drawings in which similar characters and references in the several figures indicate identical parts:

Fig. 1 is a perspective view of the device showing the same applied to the front axle portion of a vehicle.

Fig. 2 is a view showing the method of attaching the device to a channel iron front bumper.

Fig. 3 is a transverse sectional view taken on line 10—10 of Fig. 1.

Fig. 4 is a view showing the method of attaching the device to an I-section front axle.

Fig. 5 is a view showing the method of attaching the device to a round front axle.

Fig. 6 is a view showing a method of attaching the device to a front spring.

Fig. 7 is a view showing the method of attaching the device to a passenger car bumper wherein the bumper is reinforced with a block of wood or other material.

Fig. 8 is a side elevation of the rear end of the tow bar assembly.

Fig. 9 is a top plan view of the same.

Reference now being made to the drawings by numeral, 20 indicates a channel iron front bumper of a vehicle 21, to which the tow bar 22 is secured. It is the purpose of the invention to provide a tow bar consisting of a universal fitting adapted to be clamped or secured to various types and sizes of axles and bumpers.

The tow bar construction consists of a tow bar clamp bracket 23 having one-half a rectangular socket 24 which is provided with the usual bolt-holds 25 and clevis bearing ears 26 having clevis pin opening 27 therein adapted to receive a long clevis pin 28. The clevis bearing ears 26 are provided with lock bolt openings 29 which are adapted to receive a bolt 30 for locking the tow bar in any position best suited for the towing operation at hand.

The tow bar clamp bracket is adapted to be connected to the front of the axle or bumper of the vehicle to be towed, a clamp plate 31 having one-half a rectangular socket 32 and the usual bolt-holds 25 is adapted to be placed in the rear of the axle or bumper of the vehicle so that bolts 33, which are adapted to receive nuts 34, can be passed through the openings 25 of the tow bar clamp bracket 23 and openings 25 of the clamp plate 31. The nuts 34 are adapted to be tightened in order that the tow bar can be rigidly secured to the front axle or bumper of the vehicle to be towed.

Pivotally connected to the clevis bearing ears 26 by means of the clevis pin 28 is the tow bar joint cross 35 which is also pivotally connected to the bifurcated rear end or tow bar yoke 36 of the tow bar 22 by means of a short clevis pin 37.

The forward end of the tow bar 22 is provided with a lunette 38 which is adapted to be connected to the rear of the towing vehicle.

The tow bar 22, as shown in Fig. 3, comprises a core 39, side plates 40, and upper and lower plates 41. The upper and lower plates 41 are spot-welded, as shown at 42, to side plates 40, thus a light, yet strong, tow bar is produced that will have the strength of a solid bar yet will be light and easy to handle.

The bar 22 is formed intermediate its ends of an arcuate-shaped portion 43. This arcuate-shaped portion is provided for two reasons, first, to enable the bar to pass under the bumper, when the bar is connected to the front axle of a vehicle and, second, to act as the fulcrum point when the tow bar is used as an emergency jack.

Thus, by placing the rear end of the tow bar under the axle and pressing downward on the forward end thereof, the front of a light vehicle or one end of a heavy vehicle may be lifted to effect quick repairs upon the wheel, or change a tire of the vehicle.

On the front of the motor vehicle 21 there are usually provided two hooks 44, which are adapted to be used in garages and other places for hooking the chain of a block pulley thereto for raising the front end of the vehicle for repair purposes. To prevent the towed vehicle from being uncoupled from the towing vehicle, if the rear end of the tow bar should become disconnected therefrom, there is provided a safety chain 45, which connects onto the hooks 44 and a hook 46 on the forward end of the tow bar. Thus is provided means for preventing the towing vehicle and towed vehicle from becoming disengaged during the towing operation.

In referring to the figures by number, it has been illustrated how the clamp bracket assembly can be connected to an I-section front axle 47, and a round front axle 48. When the tow bar is connected to the round type of axle, the bolt 30 is inserted in one of the openings 29 to prevent vertical movement of the tow bar clamp and thus prevent the clamp from turning on the axle housing.

In connecting the clamp bracket assembly to a front spring, as shown in Fig. 6, the projection end of the clamp plate 31 should be placed against spring-eye 49 of the spring to take the thrust.

When the clamp assembly is attached to the bumper of a passenger car, as shown in Fig. 7, the bumper 50 should be reinforced with a piece of wood or other material 51, placed in back thereof, and a piece of leather, canvas, or the like, not shown, can be placed around the bumper to protect the chromium finish.

It is thought that persons skilled in the art to which the invention relates will be able to obtain a clear understanding of the invention after considering the description in connection with the drawings. Therefore, it is regarded as unnecessary to go into a lengthy description of the operation of the device.

The invention, however, is not to be understood as restricted to the details set forth, since these may be modified within the scope of the appended claims without departing from the spirit and scope of the invention.

Having thus described the invention, what is claimed as new and desired to secure by Letters Patent is:

1. A tow bar having an arcuate portion intermediate its forward and rear ends, means on the rear end thereof for connecting said end to a towed vehicle, said means comprising a yoke adapted to receive a tow bar joint cross, a clevis for pivotally receiving said tow bar joint cross, openings in said clevis to receive a lock bolt for retaining said tow bar joint cross in a position adapted to coincide with the height of the towing vehicle, said clevis being adapted to be rigidly fastened to the front axle of said towed vehicle, a clevis pin for pivotally connecting said yoke and said tow bar joint cross and means on the forward end of said tow bar for connecting said forward end to a towing vehicle.

2. A tow bar having an arcuate portion intermediate its forward and rear ends, means on the rear end thereof for connecting said end to the axle or bumper of a towed vehicle, said means comprising a yoke adapted to receive a tow bar joint cross, a clevis for pivotally receiving said tow bar joint cross, openings in said clevis to receive a lock bolt for retaining said tow bar joint cross in a position adapted to coincide with the height of the towing vehicle, said clevis being adapted to be rigidly fastened to the front axle of said towed vehicle, a clevis pin for pivotally connecting said yoke and said tow bar joint cross, means on the forward end of said tow bar for connecting said forward end to a towing vehicle, and means adjacent said forward end adapted to receive means connected to said towed vehicle for preventing the disconnection of said towed and towing vehicles, said means comprising a continuous adjustable link chain.

WILLIAM B. JOHNSON.
WILFRED G. BURGAN.